3,269,276
ROLLING DIAPHRAGM DEVICE WITH DIA-
PHRAGM HAVING A CLAMPING INSERT
Julian S. Natanson, Lexington, Mass., assignor to John F.
Taplin, West Newton, Mass., a corporation of Massa-
chusetts
Filed Mar. 17, 1965, Ser. No. 440,497
7 Claims. (Cl. 92—99)

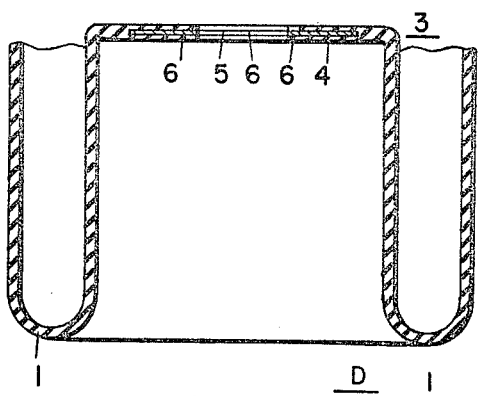
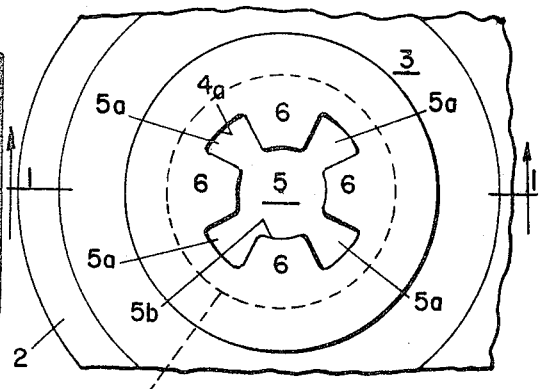
FIG. 1  FIG. 2
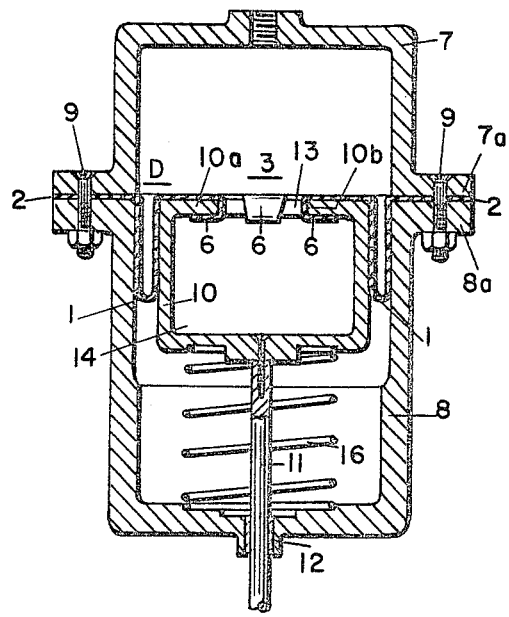
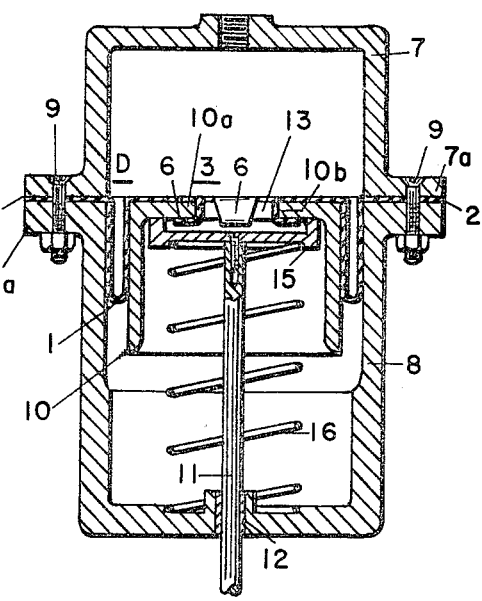
FIG. 3  FIG. 4
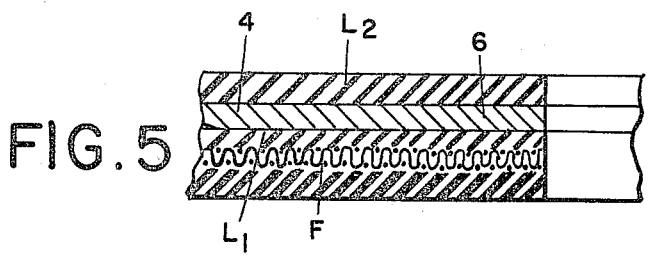
FIG. 5
INVENTOR.
JULIAN S. NATANSON United States Patent Office 3,269,276
Patented August 30, 1966

This invention is concerned with rolling diaphragms and rolling diaphragm devices such as, for instance, fluid actuators and piston pumps.

It is one object of this invention to provide rolling diaphragms having novel and improved means for securing the center portion of the rolling diaphragm to the piston of a rolling diaphragm device.

Another object of this invention is to provide rolling diaphragm devices wherein the center portion of the rolling diaphragm is secured by novel and improved means to the piston of the rolling diaphragm device.

Another object of this invention is to provide rolling diaphragms that lend themselves to be secured to the piston of a rolling diaphragm device by simple and less expensive means than the clamping plates generally used for this purpose.

Another object of this invention is to provide rolling diaphragm devices including a piston wherein conventional diaphragm clamping plates for securing the rolling diaphragm of the device to the piston thereof are dispensed with.

A further object of this invention is to provide rolling diaphragm devices wherein very simple and effective fastener means for securing the diaphragm of the device to its piston are substituted for the conventional diaphragm clamping plates generally used for this purpose.

These and other objects of the invention and advantages thereof will become more apparent from the following detailed description of two embodiments of the invention when considered in connection with the accompanying drawings, wherein:

FIG. 1 is a longitudinal section of a rolling diaphragm embodying the invention taken along 1—1 of FIG. 2, some portions of the diaphragm, i.e. its radially outer clamping flange, being broken away;

FIG. 2 is a top plan view of the structure of FIG. 1, portions of its radially outer clamping flange being broken away;

FIG. 3 is a longitudinal section of a rolling diaphragm device embodying this invention and including a piston movably arranged in a cylinder body;

FIG. 4 is a longitudinal section of another rolling diaphragm device embodying this invention and including a piston movably arranged in a cylinder body; and FIG. 5 shows diagrammatically in considerable magnification a section across the radially inner portion of a diaphragm embodying this invention.

Referring now to the drawings, and more particularly to FIGS. 1 and 2 thereof, reference letter D has been applied to generally indicate a rolling diaphragm having a rolling wall 1, radially outer clamping means 2 as, for instance, a radially outer clamping flange, and radially inner clamping means generally indicated by the reference number 3. The rolling diaphragm shown in FIGS. 1 and 2—and also that shown in FIGS. 3 and 4—is preferably a rolling diaphragm made in accordance with the teachings of U.S. Patent 2,849,026 to John F. Taplin; Aug. 26, 1958 for Flexible Fluid Sealing Diaphragm. Diaphragms as disclosed in the above patent and in the above patent application comprise a woven fabric insert and a skin of natural or synthetic rubber or of another appropriate elastomer. The threads of the woven fabric insert are compacted circumferentially, i.e. in the direction of tangents which may be drawn to any circular cross-section of the rolling wall of the diaphragm sectioning the same at right angles to the longitudinal axis thereof. Fabric inserts for rolling diaphragms of the contemplated kind are substantially hat-shaped and the constituent threads of the fabric insert are compacted progressively from the top portion of the insert to the radially outer clamping flange portion thereof. As a result, the rolling wall of the diaphragm has a significant circumferential elasticity required of it to enlarge its circumference when rolling from a piston of relatively small outer diameter upon a cylinder of relatively large inner diameter, or to reduce its circumference when rolling from a cylinder having a relatively large inner diameter upon a piston having a relatively small outer diameter. The diaphragm shown in FIGS. 1 and 2 includes a fastener plate 4 integral with the radially inner clamping means 3 and made of a material capable of being bent and retaining a predetermined shape when having been bent into it. This requirement may be met by many sheet metals of relatively limited elasticity. It may also be met by synthetic resins in sheet form which lend themselves to be formed under the action of heat and pressure, and then retain the shape which has been imparted to them under such action. Fastener plate 4 defines a central aperture generally indicated by the reference character 5 and fastener plate 4 includes a plurality of tab-like projections 6 extending radially inwardly into aperture 5. Fastener plate 4 is vulcanized, or otherwise bonded, to the top portion of the fabric insert F of the rolling diaphragm device only shown in FIG. 5 and omitted in the other figures. The same elastomer which is used to render the rolling diaphragm impervious to fluids may also be used to secure the fastener plate 4 to fabric insert F of the diaphragm. The fastener plate 4 should be positioned between two layers $L_1$, $L_2$ of an elastomer of which one is situated between the fabric insert F and plate 4 and the other on the side of plate 4 remote from the fabric insert F (see FIG. 5). It will be noted from FIG. 2 that the central aperture of fastener plate 4 defines a radially inner edge 4a having substantially the geometry of the radially inner edge of a gear with internal teeth, tab-like projections 6 being in the shape of the teeth of such a gear. It will be noted from FIG. 1 that plate 4 does not extend radially outwardly to the edge formed between rolling wall 1 and the top portion 3 of the rolling diaphragm D. In other words, the outer diameter of plate 4 is slightly less than the outer diameter of the top portion 3 of rolling diaphragm D. Plate 4 is coextensive with the center region of the top portion 3 of the rolling diaphragm. The center aperture 5 includes portions 5a having a relatively large inner diameter alternating with portions 5b having a relatively small inner diameter. The radially inwardly extending tabs 6 are formed between adjacent portions 5a of relatively large diameter. Fastener tabs 6 are a means for securing the portion 3 of the rolling diaphragm to the end surface of a piston as will be set forth more in detail in connection with FIGS. 3 and 4.

Referring now to FIG. 3, numerals 7 and 8 have been applied to indicate two complementary shells forming a cylinder body. Shells 7 and 8 have juxtaposed flanges 7a, 8a which are held in position by transverse screws 9. The radially outer clamping flange 2 of rolling diaphragm D is clamped between flanges 7a and 8a. Piston 10 having a piston rod 11 sliding in a bearing 12 integral with shell 8 is movable inside the cylindrical space bounded by shells 7 and 8. Piston 10 has an end surface 10a and end surface 10a defines an aperture 13 extending transversely across the end surface 10a of piston 10 and forming an edge 10b at said end surface. Fastener plate 4 is integral with the top portion or radially inner flange 3 of rolling diaphragm D. Fastener plate 4 has a plurality of fastener tabs 6 which are angularly displaced 90 degrees, as shown in FIG. 2, and which are bent around the edge 10b formed by aperture 13 at end surface 10a. It will be observed that clamping tabs 6 are bent substantially in a 180 degree turn—or U turn—around edge 10b and that the lower side of the end surface 10a of piston 10 is in abutting engagement with the portions of clamping tabs 6 bent around edge 10b. Edge 10b is circular and its diameter is equal to the portions of the aperture 5 of fastener plate 4 which have a relatively large diameter, indicated in FIG. 2 by the reference character 5a.

The piston 10 of FIG. 3 forms a relatively large cavity 14 accessible to fluid contained in the chamber defined by shell 7, rolling diaphragm D and piston 10. The structure of FIG. 4 is substantially the same as that shown in FIG. 3 and the same reference characters have been applied in both figures to indicate like parts. Hence FIG. 4 calls for a separate description only to the extent that the structure shown therein differs significantly from that shown in FIG. 3. In the structure of FIG. 4 piston 10 is shaped in conventional fashion. The aperture 13 in its end surface 10a is closed by an inverted bell-shaped member 15 secured, e.g. welded, to the lower side of end surface 10a.

In FIGS. 3 and 4 piston 10 under the bias of helical spring 16 has been shown in its position midway between the up-stroke position and the down-stroke position thereof. When piston 10 is moved upwardly rolling wall 1 of diaphragm D rolls off the cylindrical wall formed by shells 7, 8 unto the lateral wall of piston 10. When piston 10 is moved downwardly rolling wall 1 of diaphragm D rolls off piston 10 unto the cylindrical wall formed by shell 7, 8.

Other embodiments of the invention within the scope of the claims will occur to those skilled in the art.

I claim as my invention:

1. In a rolling diaphragm having radially outer clamping means, radially inner clamping means and a rolling wall between said radially outer clamping means and said radially inner clamping means the improvement comprising a fastener plate of a material capable of being bent and of retaining a predetermined shape into which it has been bent, said fastener plate being integral with said radially inner clamping means and defining a central aperture, and said fastener plate including a plurality of tab-like projections extending radially inwardly into said central aperture.

2. In a rolling diaphragm having radially outer clamping means, radially inner clamping means and a rolling wall between said radially outer clamping means and said radially inner clamping means the improvement comprising a fastener plate of metal coextensive with and integral with the radially inner portion of said radially inner clamping means, said fastener plate having a central aperture and said central aperture having a radially inner edge having subtsantially the geometry of the radially inner edge of a gear having internal teeth.

3. In a rolling diaphragm having a hat-shaped elastomer-impregnated fabric insert whose constituent threads are progressively circumferentially compacted in the direction from the top portion to the bottom portion of the fabric insert the improvement comprising a substantially disc-shaped fastener element of a relatively nonelastic sheet material defining a central aperture being substantially in the shape of a gear having internal toothing, said disc-shaped fastener element being coextensive with the center region of said top portion of said fabric insert and bonded to said top portion by the elastomer-impregnant of said fabric insert.

4. In a rolling diaphragm having a hat-shaped elastomer-impregnated fabric insert whose constituent threads are progressively circumferentially compacted in the direction from the top portion to the bottom portion of said fabric insert the improvement comprising a flat deformable fastener plate bonded to said top portion of said fabric insert, said plate having a central aperture including portions having a relatively large inner diameter and portions having a relatively small inner diameter alternating with said portions having a relatively large diameter, said plate thereby forming radially inwardly extending tabs between contiguous portions of said aperture having said relatively large inner diameter.

5. A rolling diaphragm device comprising in combination:
    (a) a cylinder body;
    (b) a piston movably arranged inside of said cylinder body, said piston having an end surface and said end surface defining an aperture extending transversely across said end surface and forming an edge at said end surface;
    (c) a rolling diaphragm having radially outer clamping means secured to said cylinder body, a radially inner flange secured to said piston and a rolling wall intermediate said radially outer clamping means and said radially inner flange; and
    (d) a fastener plate integral with said radially inner flange of said rolling diaphragm, said fastener plate having a plurality of fastener tabs bent around said edge formed by said aperture at said end surface of said piston.

6. A rolling diaphragm device comprising in combination:
    (a) a cylinder body;
    (b) a piston movably arranged inside said cylinder body, said piston having an end surface and said end surface defining an aperture extending transversely across said end surface and forming an edge at said end surface;
    (c) a rolling diaphragm including an elastomer-impregnated fabric insert whose constituent threads are progressively circumferentially compacted from the radially inner portion to the radially outer portion thereof;
    (d) means for clamping the radially outer portion of said rolling diaphragm to said cylinder body; and
    (e) a fastener plate bonded to said radially inner portion of said rolling diaphragm and having clamping tabs projecting into said aperture in said end surface of said piston and being bent substantially in a 180 degree turn around said edge formed by said aperture in said end surface of said piston.

7. A rolling diaphragm device comprising in combination:
    (a) a cylinder body;
    (b) a piston movably arranged inside said cylinder body, said piston having an end surface and said end surface defining a circular aperture having a predetermined diameter, extending transversely across said end surface and forming an edge at said end surface;

(c) a rolling diaphragm comprising a woven fabric insert and a skin of an elastomer bonded to said fabric insert;
(d) means for clamping the radially outer portion of said rolling diaphragm to said cylinder body; and
(e) a fastener plate of metal bonded to the radially inner portion of said rolling diaphragm, said fastener plate having a central aperture including portions having a diameter substantially equal to said circular aperture in said piston and portions having a relatively smaller diameter alternating with said portions having a diameter substantially equal to said circular aperture in said piston, said plate forming fastener tabs between adjacent portions of said aperture having a diameter substantially equal to said circular aperture in said piston, and said fastener tabs being bent around said edge into abutting engagement with the lower side of said end surface of said piston.

References Cited by the Examiner
UNITED STATES PATENTS

| | | | |
|---|---|---|---|
| 2,633,155 | 3/1953 | Wallerstein | 103—150 X |
| 3,012,546 | 12/1961 | Heintzmann et al. | 92—99 X |
| 3,083,734 | 4/1963 | Taplin | 92—103 |
| 3,227,093 | 1/1966 | Taplin | 92—100 X |

MARTIN P. SCHWADRON, *Primary Examiner.*
IRWIN CHARLES COHEN, *Assistant Examiner.*